United States Patent
Subramanian

(10) Patent No.: US 9,247,073 B2
(45) Date of Patent: Jan. 26, 2016

(54) METHOD OF PACING BULK OPERATIONS BASED ON AVAILABLE SYSTEM RESOURCES

(71) Applicant: ALCATEL-LUCENT CANADA INC., Ottawa (CA)

(72) Inventor: Ramaswamy Subramanian, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 70 days.

(21) Appl. No.: 14/251,294

(22) Filed: Apr. 11, 2014

(65) Prior Publication Data

US 2015/0296089 A1    Oct. 15, 2015

(51) Int. Cl.
*H04M 11/00*    (2006.01)
*H04M 15/00*    (2006.01)
*H04M 3/22*    (2006.01)
*H04W 24/02*    (2009.01)

(52) U.S. Cl.
CPC .......... *H04M 15/705* (2013.01); *H04M 3/2263* (2013.01); *H04M 15/66* (2013.01); *H04W 24/02* (2013.01)

(58) Field of Classification Search
CPC . H04M 15/705; H04M 15/66; H04M 3/2263; H04W 24/02
See application file for complete search history.

(56) References Cited

U.S. PATENT DOCUMENTS

2010/0311421 A1* 12/2010 Mach .................... H04W 48/16
                                                    455/436
2012/0178440 A1*  7/2012 Aidee ................... H04W 4/005
                                                    455/426.1

* cited by examiner

*Primary Examiner* — Chuong A Ngo
(74) *Attorney, Agent, or Firm* — Kramer & Amado, P.C.

(57) ABSTRACT

Various exemplary embodiments relate to a method performed by a network node, the method including: calculating a number of accounts allowed for reset (NAAR) in a schedule interval based upon a usage reset scheduler rate (URSR) and a schedule interval (SI); receiving a list of accounts to be reset; determining if a spot in the reset queue is available; and processing an account reset when a spot in the reset queue is available further including: queuing a reset request for the account; and calculating the expected number of resets (ER).

22 Claims, 6 Drawing Sheets

METHOD OF PACING BULK OPERATIONS BASED ON AVAILABLE SYSTEM RESOURCES

TECHNICAL FIELD

Various exemplary embodiments disclosed herein relate generally to communication networks.

BACKGROUND

The Third Generation Partnership Project (3GPP) has defined a network that includes various policy and charging control (PCC), mobility management, and IP multimedia subsystem (IMS) applications. In the PCC aspects of the system it may be required to reset various parameters, metrics, or other aspects for users of the network. These sorts of operations may be done periodically and in bulk.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node, the method including: calculating a number of accounts allowed for reset (NAAR) in a schedule interval based upon a usage reset scheduler rate (URSR) and a schedule interval (SI); receiving a list of accounts to be reset; determining if a spot in the reset queue is available; and processing an account reset when a spot in the reset queue is available further including: queuing a reset request for the account; and calculating the expected number of resets (ER).

Various exemplary embodiments relate to a non-transitory machine-readable storage medium encoded with instructions for execution by a network node, the method including: instructions for calculate a number of accounts allowed for reset (NAAR) in a schedule interval based upon a usage reset scheduler rate (URSR) and a schedule interval (SI); instructions for receiving a list of accounts to be reset; instructions for determining if a spot in the reset queue is available; and instructions for processing an account reset when a spot in the reset queue is available further including: instructions for queuing a reset request for the account; and instructions for calculating the expected number of resets (ER).

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Current wireless communication systems have the capability to accumulate usage for subscribers. Metering limits may be configured to accumulate the usage. The metering limit may be applied over a period of time, such as daily, weekly or monthly. Based on this configuration and based on the billing cycle, the usage has to be reset.

This reset may be a bulk operation which involves fetching the records of thousands of subscribers and resetting the usage for each subscriber. Some of the important operations that take place during reset include the following: 1) reset the usage; 2) clear the thresholds if applicable; and 3) reset the quality of service (QoS) by sending RADIUS/Diameter messages to the network element if applicable. These operations are resource intensive. Accordingly, scheduling large numbers of resets at once may lead to over loading of the system if the bulk resets are given high enough of a priority. Alternatively, if the bulk resets are given a low priority, the resets may not occur in a timely matter, as the resets are preempted by high priority tasks.

As a result there is a need for a pacing mechanism to control the rate at which the bulk reset will take place. The parameters related to the reset rate may be configurable. At the same time, system may be capable of adjusting this pace automatically based on available system resources for performing this operation.

Figure 1:
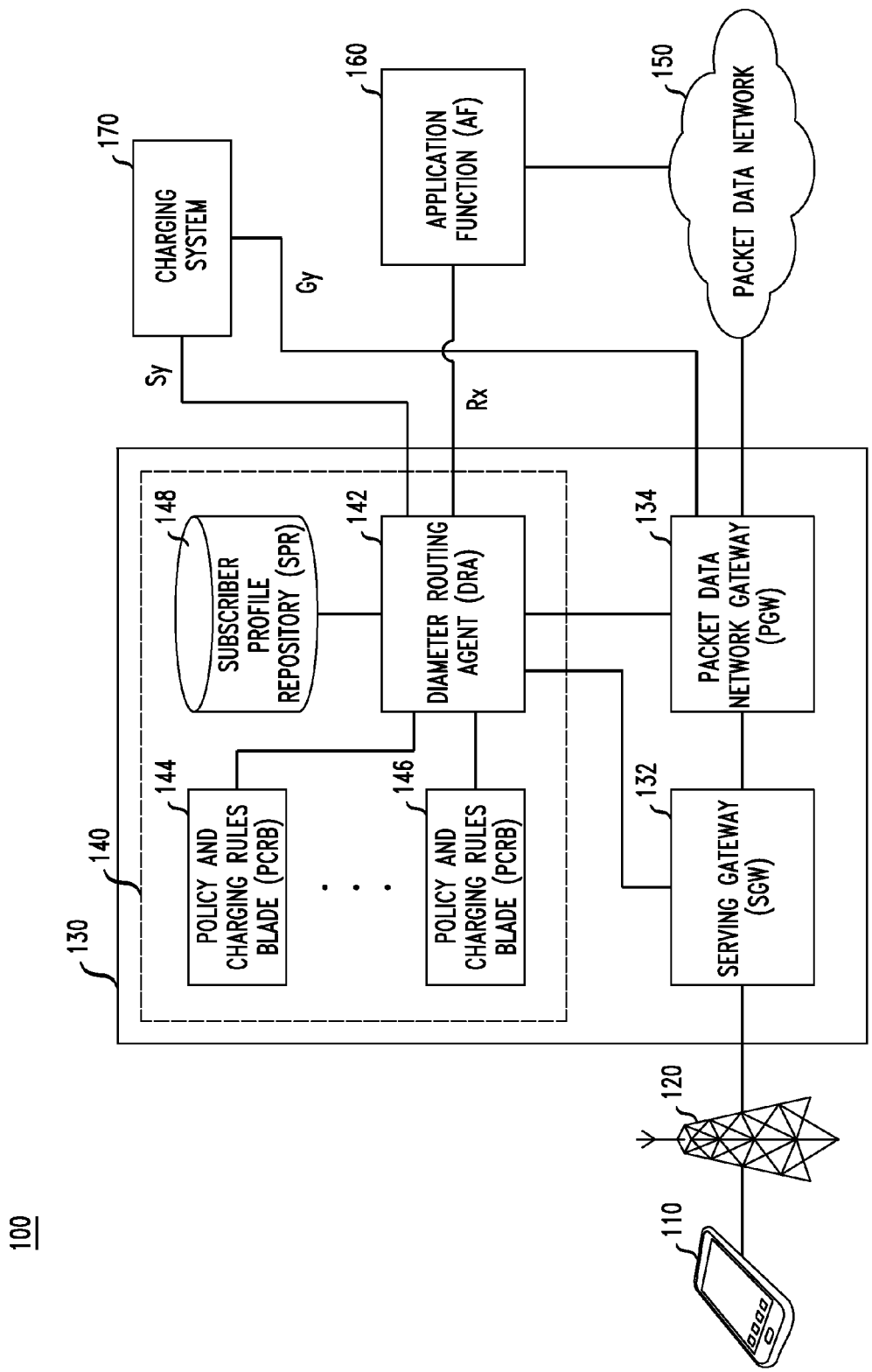
FIG. 1 illustrates an exemplary network environment.

FIG. 1 illustrates an exemplary network environment. Exemplary network environment 100 may be a subscriber network for providing various services. In various embodiments, subscriber network 100 may be a public land mobile network (PLMN). Exemplary subscriber network 100 may be a telecommunications network or other network for providing access to various services. Exemplary subscriber network 100 may include user equipment 110, base station 120, evolved packet core (EPC) 130, packet data network 150, application function (AF) 160, and charging system 170.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository. The DRA 142 and PCRBs 144, 146 are Diameter nodes.

DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface. The combination of the PCRBs 144, 146 and/or the DRA 142 may constitute a policy rules and charging node (PCRN)

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 148 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110.

Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Charging system 170 may be used to track usage of subscribers. For pre-paid usage charging occurs in real-time, where the service cost is deducted from the subscriber balance while the service is in operation. For post-paid customers, usage may be collected and processed offline. The charging system 170 may receive usage information from the PGW 134. Further the charging system 170 may install monitoring keys in the PGW 134 to monitor certain types of subscriber usage. The charging system 170 receives information related to usage limits associated with the subscriber. Further, the charging system 170 may receive threshold information based upon various desired usage thresholds. When a threshold is reached certain policies may become applicable. The charging system 170 may also communicate with the PCRB 144, 146 via the DRA 142 using the Sy interface. The charging system 170 may send usage information to the PCRB 144, 145. The charging system may send indications when various thresholds have been exceeded such as for example an OUT_OF CREDIT event to the PGW 134, and the PGW 134 may then send an OUT_OF_CREDIT event trigger to the PCRB 144, 146.

As described above the network may have various bulk operations that need to be performed for a large number of subscribers. Examples of such bulk operations include resetting of usage limits, changing of billing days, changes in QoS parameters associated with specific tiers of service, changing bandwidth limits, etc. For example, the resetting of usage limits may be done for monthly, weekly, daily, hourly, or carry over usage limits. As a single PCRN may service up to 1,000,000 users, the number of resets needed at different times, may be quite large. The same may be true for other bulk operations that may be carried out by the network. For example, if users with gold level service get an increased data usage limit, then the data usage limit for each of those gold level users needs to be changed.

In order to prevent system overload when carrying out bulk operations, such operations may be paced in order to strike a balance between accomplishing the bulk operation and the other system functions (e.g., processing DIAMETER messages, responding to an application function, or responding to a user input). Below a method is described that will control the pace at which bulk operations are carried out. In order to demonstrate the pacing method, the example of resetting a users usage limit will be used. The pacing method may be applied to other bulk operations as well.

Figure 2:
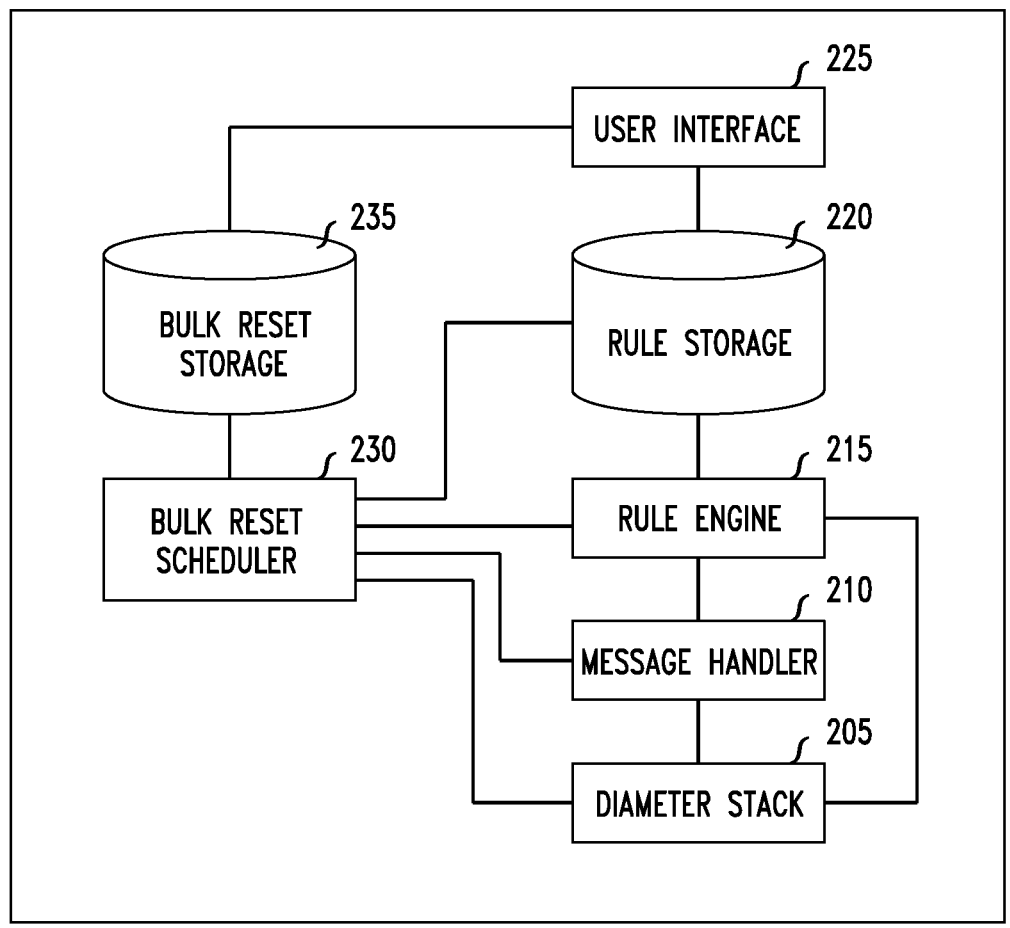
FIG. 2 illustrates an exemplary Diameter node.

FIG. 2 illustrates an exemplary Diameter node (DN) 200. DN 200 may be a standalone device or a component of another system. For example, DN 200 may correspond to DRA 142, the charging system 170, or the PCRBs 144, 146 that act as a PCRN of exemplary environment 100. In such an embodiment, DN 142 may support various Diameter applications defined by the 3GPP such as, for example, Gx, Gxx, Rx, or Sp. It will be understood that DN 200 may be deployed in various alternative embodiments wherein additional or alternative applications are supported. As such, it will be apparent that the methods and systems described herein may be generally applicable to supporting any Diameter applications and messages of other protocols such as RADIUS, SS7 or HTTP/XML, among others.

DN 200 may include a number of components such as Diameter stack 205, message handler 210, rule engine 215, rule storage 220, user interface 225, bulk reset scheduler 230, and bulk reset storage 235.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine 215 using a rule set that is appropriate for the extracted message type. For example, the message type may be defined by the application and command of the received message. After evaluating one or more rules, rule engine 215 may pass back an action to be taken or a message to be sent. Message handler 210 may then transmit one or more messages via Diameter stack 205, as indicated by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. The rules evaluated by the rule engine 215 may be one of various types of rules, for example, policy rules, shedding rules, routing rules, or context routing rules.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DN 200. For example, user interface 225 may enable a user to define various types of bulk resets to perform and the parameters associated therewith. The user may also define other sorts of rules for use by the rule engine 215 as well. Various additional methods for a user to customize the behavior of DN 200 via user interface 225 will be apparent to those of skill in the art.

Bulk reset scheduler 230 may include hardware or executable instructions on a machine-readable storage medium configured to carry out bulk resets. The bulk reset scheduler 230 communicates with the message handler 210 and the diameter stack 205 in order to send messages regarding QoS or other metrics related to the bulk reset. The operation of the bulk reset scheduler 230 will be described in greater detail below. It is also noted that the bulk reset scheduler may be implemented as part of the rules engine 215.

Bulk reset storage 235 may be any machine-readable medium capable of storing data needed by the bulk reset scheduler 230. For example, data related to users whose usage needs to be reset may be stored in the bulk reset storage 234. Further, the bulk reset storage 235 may keep a list of currently pending reset requests as well as a history of completed reset requests. Accordingly, bulk reset storage 235 may include a machine-readable storage medium such as read-only memory (ROM), random-access memory (RAM), magnetic disk storage media, optical storage media, flash-memory devices, and/or similar storage media. In various embodiments, bulk reset storage 235 may store bulk reset data sets using various data structures as will be apparent. Further, the bulk reset storage 235 may be part of the rules storage 220 or any other available storage device on the DN 200.

The network operator may use the user interface 235 to access the bulk reset storage 235 to view various bulk reset data. The user interface 225 may include a display to select and view bulk reset data. Such ability to view and set the bulk reset data allows the network operator to determine the overall system performance. It might also provide information regarding performance problems.

Figure 3:
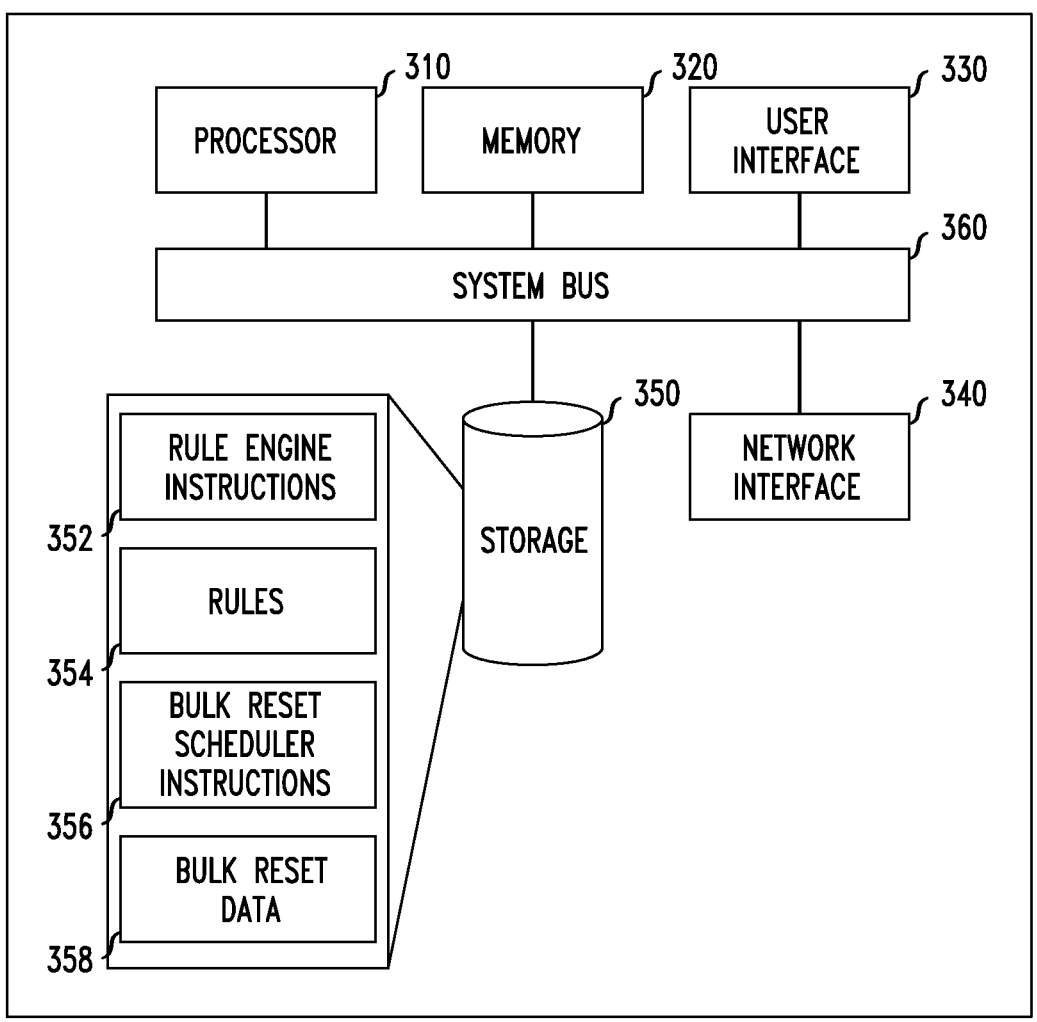
FIG. 3 illustrates an exemplary hardware diagram of a Diameter node.

FIG. 3 illustrates an exemplary hardware diagram of a Diameter node 300. The exemplary DN 300 may correspond to the DN 200 of FIG. 2 or to DRA 142 or the PCRBs 144, 146 that act as a PCRN of exemplary environment 100 of FIG. 1.

As shown, the hardware device 300 may include a processor 310, memory 320, user interface 330, network interface 340, and storage 350 interconnected via one or more system buses 360. It will be understood that FIG. 3 constitutes, in some respects, an abstraction and that the actual organization of the components of the DN 300 may be more complex than illustrated.

The processor 310 may be any hardware device capable of executing instructions stored in memory 320 or storage 350. As such, the processor may include a microprocessor, field programmable gate array (FPGA), application-specific integrated circuit (ASIC), or other similar devices.

The memory 320 may include various memories such as, for example L1, L2, or L3 cache or system memory. As such, the memory 320 may include static random access memory (SRAM), dynamic RAM (DRAM), flash memory, read only memory (ROM), or other similar memory devices.

The user interface 330 may include one or more devices for enabling communication with a user such as an administrator. For example, the user interface 330 may include a display, a mouse, and a keyboard for receiving user commands.

The network interface 340 may include one or more devices for enabling communication with other hardware devices. For example, the network interface 340 may include a network interface card (NIC) configured to communicate according to the Ethernet protocol. Additionally, the network interface 340 may implement a TCP/IP stack for communication according to the TCP/IP protocols. Various alternative or additional hardware or configurations for the network interface 340 will be apparent.

The storage 350 may include one or more machine-readable storage media such as read-only memory (ROM), random-access memory (RAM), magnetic disk storage media, optical storage media, flash-memory devices, or similar storage media. In various embodiments, the storage 350 may store instructions for execution by the processor 310 or data upon with the processor 310 may operate. For example, the storage 350 may store rule engine instructions 352 and rules 354 read and acted upon by the rule engine. The storage 350 may also store bulk reset scheduler instructions 356 that control the operation of the bulk reset scheduler 230. Further, the storage 350 may store bulk reset data 358. It will be apparent that various information described as stored in the storage 350 may be additionally or alternatively stored in the memory 320. Various other arrangements will be apparent.

Multiple parameters may be used for controlling the pace at which the bulk reset operation takes place. One parameter, the usage reset scheduler rate, (URSR) is the maximum allowed rate for bulk resets. URSR controls the absolute maximum number of accounts that may be reset per second. The system should not schedule bulk resets faster than this value. Another parameter determines the granular window at which the reset operation will be queued for processing. The schedule interval (SI) parameter determines the granular window in milliseconds (or other unit of time). Using these parameters, the number accounts allowed for reset in the schedule interval (NAAR) may be determined as follows: NAAR=URSR*SI/1000.

The following method may be implemented to control the pacing. The method may include a queue of pending reset requests. The method may also track completed reset requests.

Figure 4:
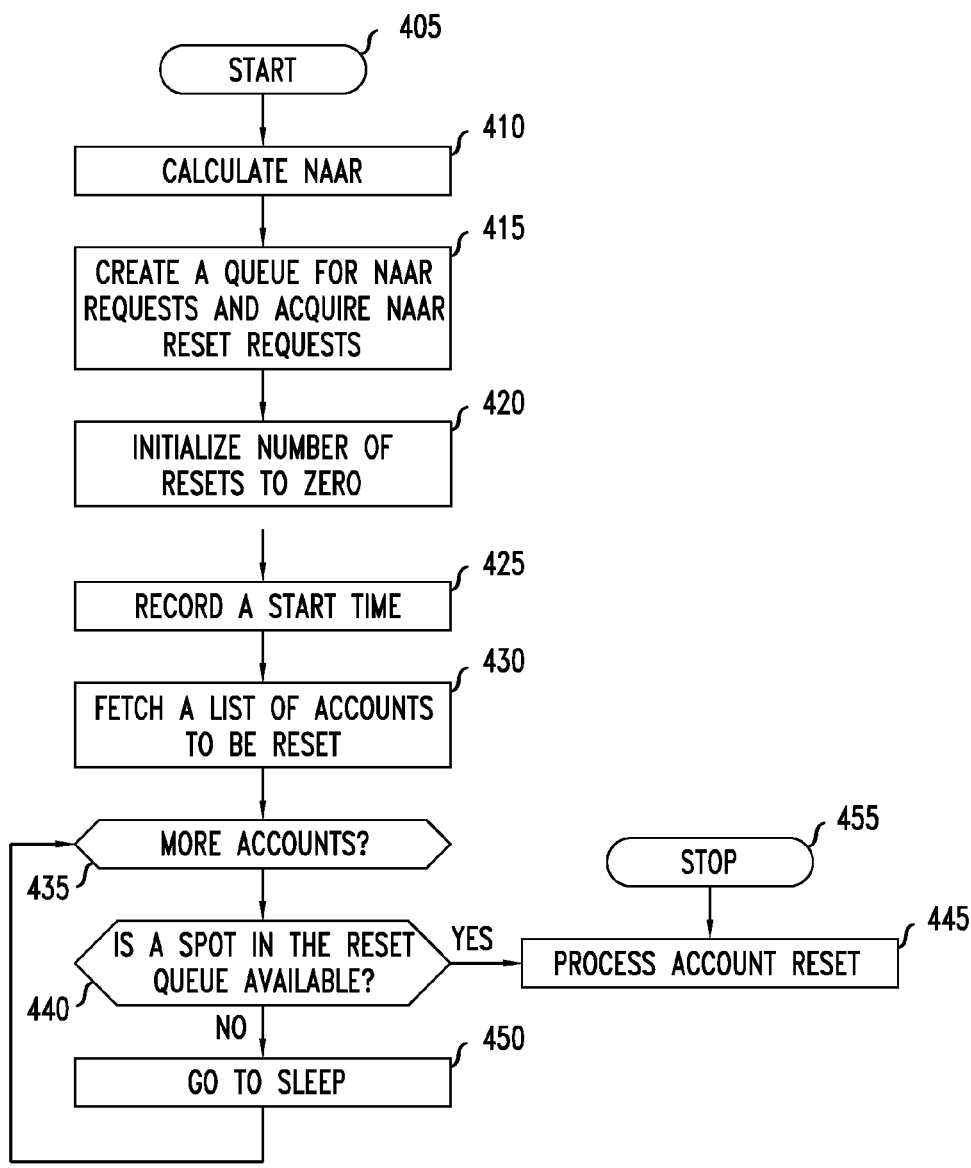
FIG. 4 illustrates an embodiment of a method for pacing bulk resets.

FIG. 4 illustrates an embodiment of a method for pacing bulk resets. The method 400 may begin at 405. The method 400 may first calculate NAAR as described above 410. Next, the method 400 may create a queue for NAAR requests and then acquire NAAR reset requests 415. The method 400 then may initialize a number of resets (NR) to zero 420. Next, the method 400 may record a start time (ST) 425. The method then fetches a list of accounts to be reset 430. The method then loops through the list of fetched subscribers. The method 400 then determines if there are more accounts in the list 435. If not, the method stops 455. If so, then the method 400 determines if there is a spot in the reset queue available 440. If a spot is not available, the method 400 goes to sleep for a period of time 450 and then returns to determine if more accounts are available 435. If a spot is available, the method 400 processes an account reset 445 and then returns to determine if more accounts are available 435.

Figure 5:
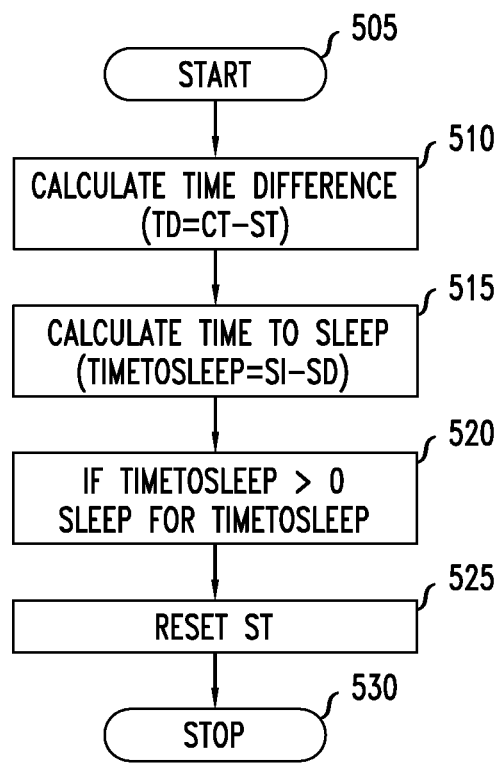
FIG. 5 illustrates the step of going to sleep for a period of time.

FIG. 5 illustrates the step of going to sleep for a period of time. The method 500 may correspond to step 450 in the method 400. The method 500 may begin at 505. First, the method 500 may calculate a time difference (TD) 510 as follows: TD=CT−ST, where CT is the current time. Next, a time to sleep (TimeToSleep) 515 may be calculated as follows: TimeToSleep=SI−TD. Next, the method determines if TimeToSleep is greater than zero 520, and if so, the method 500 sleeps for TimeToSleep. The method 500 then resets ST 525. The method 500 then ends at 530.

Figure 6:
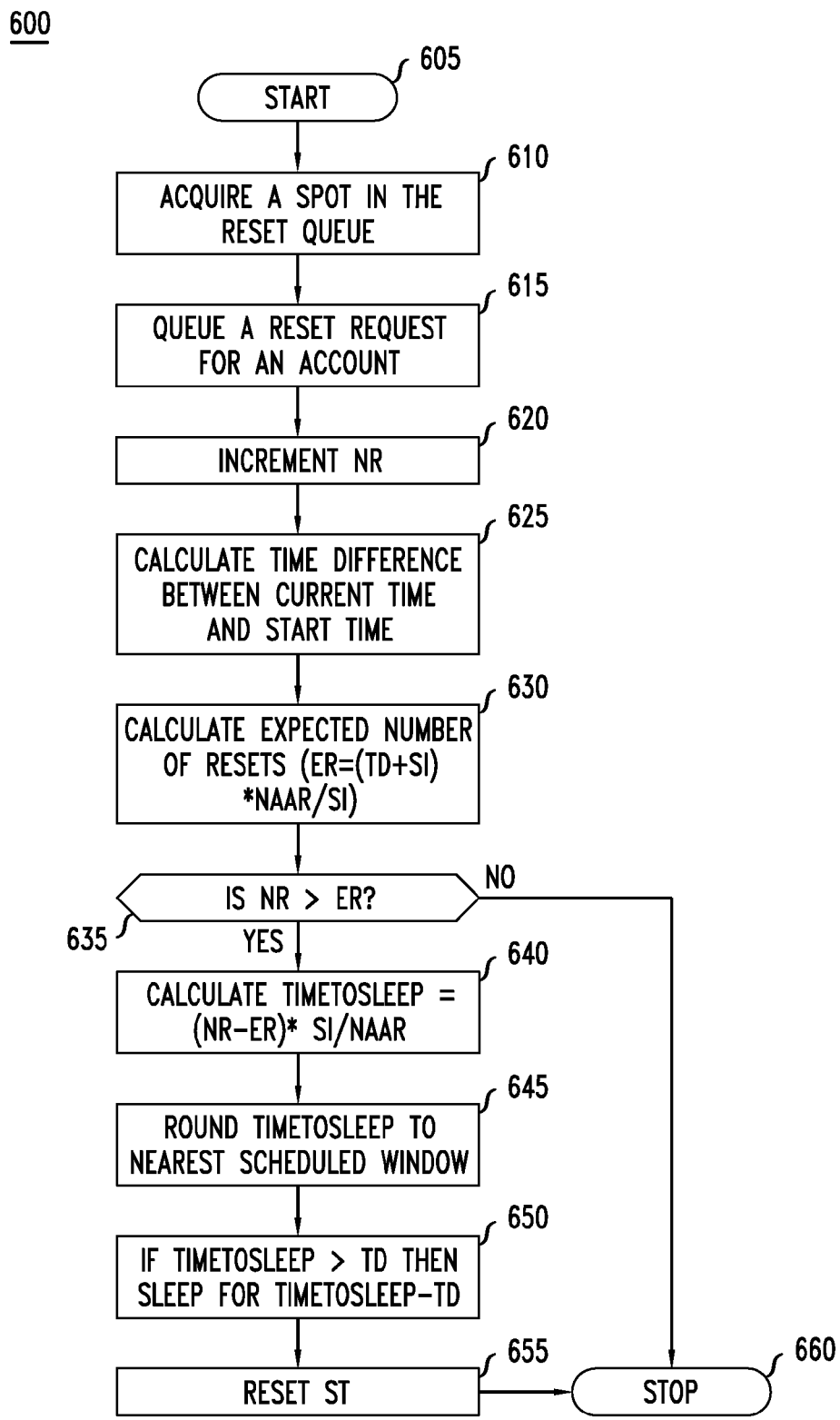
FIG. 6 illustrates a method of processing an account reset.

FIG. 6 illustrates a method of processing an account reset. The method 600 may correspond to step 445 in the method 400. The method 600 may start at 605. First, the method 600 may acquire a spot in the reset queue 610 and then queue a reset request for an account 615. The method 600 may then increment NR 620. Next, the method may calculate a time difference (TD) between the current time (CT) and the start time 625 as follows: TD=CT−ST. Next, the method calculates the expected number of resets (ER) 630 as follows: ER=(TD+SI)*NAAR/SI. It is noted that SI is added to TD because queuing always starts at the beginning of the time window. Then the method 600 determines if NR is greater than ER 635. If not, the method 600 ends at 660. If NR is greater than ER, then calculate TimeToSleep 640 as follows: TimeToSleep=(NR−ER)*SI/NAAR. Next, round TimeToSleep to the nearest schedule window 645 (as determined by SI). Next, if TimeToSleep is greater than TD, sleep for TimeToSleep−TD 650. The method 655 may then reset ST 655, and then ends at 660.

As described above the methods 400, 500, and 600 may be performed by a PCRN (or PCRB if used). Further, other network nodes in the network may have need for a bulk reset. For example, the charging system may implement the methods 400, 500, and 600. Also, the methods described above may be implemented on the bulk resent scheduler 230. Also, the methods may be implemented as bulk reset scheduler instructions 356 that run on the processor 310. Further, the methods 400, 500, and 600 may be used to pace various types of bulk resets. Also, the various steps in methods 400, 500, and 600 may be performed in a different order or in parallel as will be apparent to one of skill in the art.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node, the method comprising:
    calculating a number of accounts allowed for reset (NAAR) in a schedule interval based upon a usage reset scheduler rate (URSR) and a schedule interval (SI);
    receiving a list of accounts to be reset;
    determining if a spot in the reset queue is available; and
    processing an account reset when a spot in the reset queue is available further comprising:
        queuing a reset request for the account; and
        calculating the expected number of resets (ER).

2. The method of claim 1, further comprising:
    repeating determining if a spot in the reset queue is available;
    determining a time to sleep (TimeToSleep) when there is not a spot available in the reset queue, wherein TimeToSleep is based upon a difference between SI and a time difference TD, wherein TD is a difference between a current time and a start time; and
    sleeping for TimeToSleep when TimeToSleep is greater than 0.

3. The method of claim 2, where TimeToSleep is calculated by (NR−ER) * SI/NAAR.

4. The method of claim 2, further comprising incrementing NR before calculating the TimeToSleep.

5. The method of claim 4, further comprising, after calculating TimeToSleep, rounding TimeToSleep to the nearest schedule window based upon SI.

6. The method of claim 2, further comprising sleeping for a time based upon difference between TimeToSleep and TD when TimeToSleep is greater than TD.

7. The method of claim 6, further comprising resetting ST.

8. The method of claim 1, further comprising:
    calculating a time difference (TD) between a current time (CT) and a start time (ST);
    determining that ER is greater than a number of resets (NR); and
    calculating a time to sleep (TimeToSleep) based upon NR, ER, SI, and NAAR.

9. The method of claim 1, where ER is calculated by (TD+SI) * NAAR/SI.

10. The method of claim 1, further comprising creating a queue sized to handle NAAR requests.

11. The method of claim 1, further comprising acquiring NAAR reset requests from the queue.

12. A non-transitory machine-readable storage medium encoded with instructions for execution by a network node, the method comprising:
- instructions for calculating a number of accounts allowed for reset (NAAR) in a schedule interval based upon a usage reset scheduler rate (URSR) and a schedule interval (SI);
- instructions for receiving a list of accounts to be reset;
- instructions for determining if a spot in the reset queue is available; and
- instructions for processing an account reset when a spot in the reset queue is available further comprising:
  - instructions for queuing a reset request for the account; and
  - instructions for calculating the expected number of resets (ER).

13. The non-transitory machine-readable storage medium of claim 12, further comprising:
- instructions for repeating determining if a spot in the reset queue is available;
- instructions for determining a time to sleep (TimeToSleep) when there is not a spot available in the reset queue, wherein TimeToSleep is based upon a difference between SI and a time difference TD, wherein TD is a difference between a current time and a start time; and
- instructions for sleeping for TimeToSleep when TimeToSleep is greater than 0.

14. The non-transitory machine-readable storage medium of claim 12, further comprising:
- instructions for calculating a time difference (TD) between a current time (CT) and a start time (ST);
- instructions for determining that ER is greater than a number of resets (NR); and
- instructions for calculating a time to sleep (TimeToSleep) based upon NR, ER, SI, and NAAR.

15. The non-transitory machine-readable storage medium of claim 12, where TimeToSleep is calculated by (NR−ER) * SI/NAAR.

16. The non-transitory machine-readable storage medium of claim 12, further comprising instructions for incrementing NR before calculating the TimeToSleep.

17. The non-transitory machine-readable storage medium of claim 16, further comprising, after calculating TimeToSleep, instructions for rounding TimeToSleep to the nearest schedule window based upon SI.

18. The non-transitory machine-readable storage medium of claim 12, further comprising instructions for sleeping for a time based upon difference between TimeToSleep and TD when TimeToSleep is greater than TD.

19. The non-transitory machine-readable storage medium of claim 18, further comprising instructions for resetting ST.

20. The non-transitory machine-readable storage medium of claim 12, where ER is calculated by (TD+SI) * NAAR/SI.

21. The non-transitory machine-readable storage medium of claim 12, further comprising instructions for creating a queue sized to handle NAAR requests.

22. The non-transitory machine-readable storage medium of claim 12, further comprising instructions for acquiring NAAR reset requests from the queue.

* * * * *